(12) United States Patent
Gonzalez

(10) Patent No.: US 10,352,749 B2
(45) Date of Patent: Jul. 16, 2019

(54) CONTINUOUS VOLUME MEASUREMENT ON A RECEPTACLE FOR LIQUIDS

(71) Applicant: Carlos Manuel Gonzalez, Mission, TX (US)

(72) Inventor: Carlos Manuel Gonzalez, Mission, TX (US)

( * ) Notice: Subject to any disclaimer, the term of this patent is extended or adjusted under 35 U.S.C. 154(b) by 0 days.

(21) Appl. No.: 15/841,838

(22) Filed: Dec. 14, 2017

(65) Prior Publication Data
US 2019/0186972 A1    Jun. 20, 2019

(51) Int. Cl.
*B67D 7/02* (2010.01)
*G01F 3/38* (2006.01)
*G01F 23/16* (2006.01)
*G01F 11/28* (2006.01)

(52) U.S. Cl.
CPC ............. *G01F 11/284* (2013.01); *G01F 3/38* (2013.01); *G01F 23/16* (2013.01); *B67D 7/02* (2013.01)

(58) Field of Classification Search
CPC .......... G01F 11/284; G01F 3/38; G01F 23/16; B67D 7/02
USPC ........................................................ 73/223
See application file for complete search history.

(56) References Cited

U.S. PATENT DOCUMENTS

| 3,943,772 | A | * | 3/1976 | Clinton | G01F 19/00 73/429 |
| 4,220,048 | A | * | 9/1980 | Grepiotis | B67D 1/02 62/125 |
| 5,606,109 | A | * | 2/1997 | Sisk | G01F 17/00 73/1.73 |
| 7,603,901 | B1 | * | 10/2009 | Tai | G01F 23/64 73/323 |
| 8,136,690 | B2 | * | 3/2012 | Fang | A47G 19/2227 220/600 |
| 8,251,952 | B2 | * | 8/2012 | Curry | A61J 1/10 604/122 |
| 10,156,467 | B2 | * | 12/2018 | Curry | G01F 23/64 |

FOREIGN PATENT DOCUMENTS

WO    WO-2008100199 A1 *  8/2008  ........... B65D 77/062

* cited by examiner

*Primary Examiner* — Natalie Huls
*Assistant Examiner* — Monica S Young

(57) ABSTRACT

The present invention is about a volume-measuring device installed inside a box that used to store a liquid. The measuring device is placed at the bottom of the box dispensing the liquid, and displays via a measuring tower a measure of the volume of the liquid still in the box. The device is comprised of a receptacle or sealed pouch connected to a measuring tower. As the pressure from the weight of the liquid changes, the receptacle reacts by moving the measuring marker to reflect such change, thus measuring the current liquid volume in the dispensing box.

11 Claims, 3 Drawing Sheets

CONTINUOUS VOLUME MEASUREMENT ON A RECEPTACLE FOR LIQUIDS

This application claims priority to U.S. Provisional Application No. 62/456,810 filed on 9 Feb. 2017 entitled: Continuous Volume Measurement on a Receptacle for Liquids, which is hereby incorporated by reference in its entirety.

BACKGROUND OF THE INVENTION

There has been numerous patents for the measurement of liquids, in particular wine, like Patents [1, 2, 3, 4 and 5]. However, most if not all are about measuring the volume in the bottle or on a tank. Unfortunately none addresses the new packing of the wine now in cardboard boxes. The wine is not in contact with the cardboard box, but in a plastic sealed container with an only exit of a spout to dispense the wine. Since the boxes are closed, there is no way for a consumer to determine the quantity of wine left in the box, but just an approximation based on the current weight of the box. If you are good guessing or remembering the initial weight of the box and the weight at the current moment then you have no problem determining the amount of wine left in the box. Nevertheless, most people are not trained or good at estimating the initial weight of the box and comparing it with the current weight. The invention proposed here will solve the problem of guessing how much wine is left in the box, by just looking into our measurement device.

SUMMARY OF THE INVENTION

A device located at the bottom of the box that contains the wine (i.e. the liquid), the plastic container containing the wine will seat on top of our measuring device. The measuring device will sense the weight of the current contents on the wine in the plastic container, and will automatically move a signal indicating the level of liquid still in the plastic container. This measure will be visible from the exterior of the box by the consumer.

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
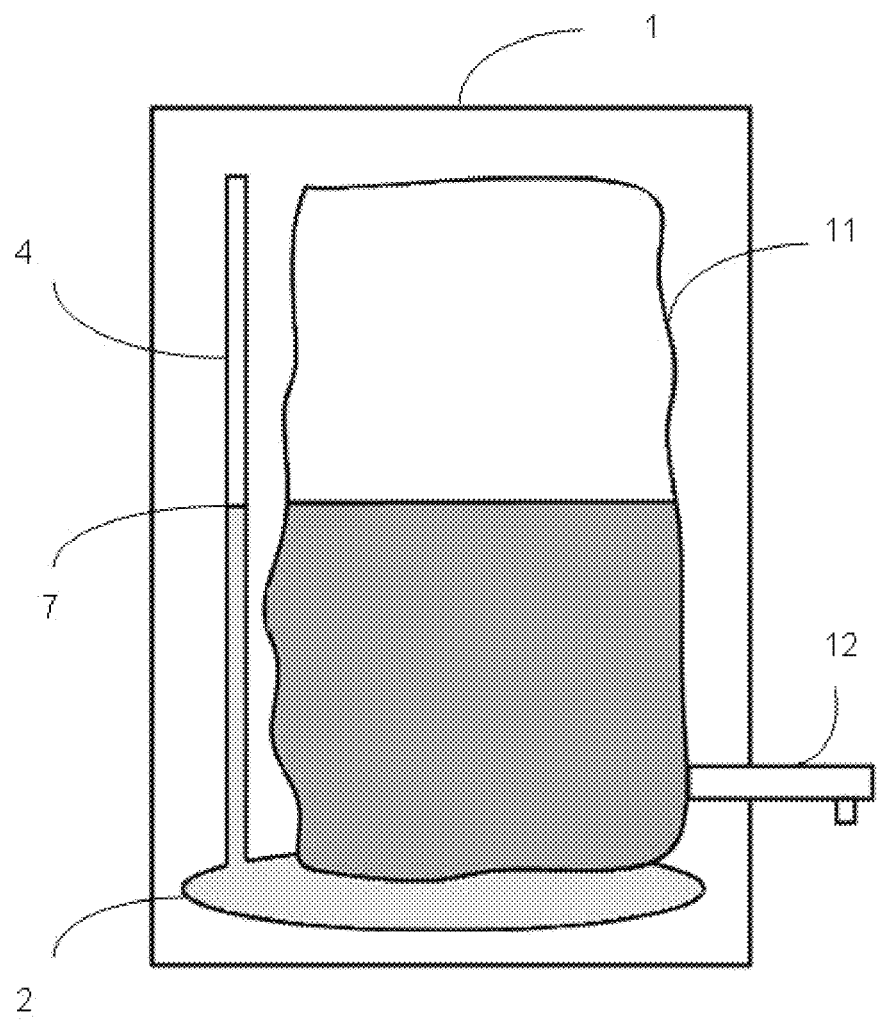
FIG. 1 is a perspective view of a volume measurement device installed in a box that will contain the liquid to be measured.
Figure 2:
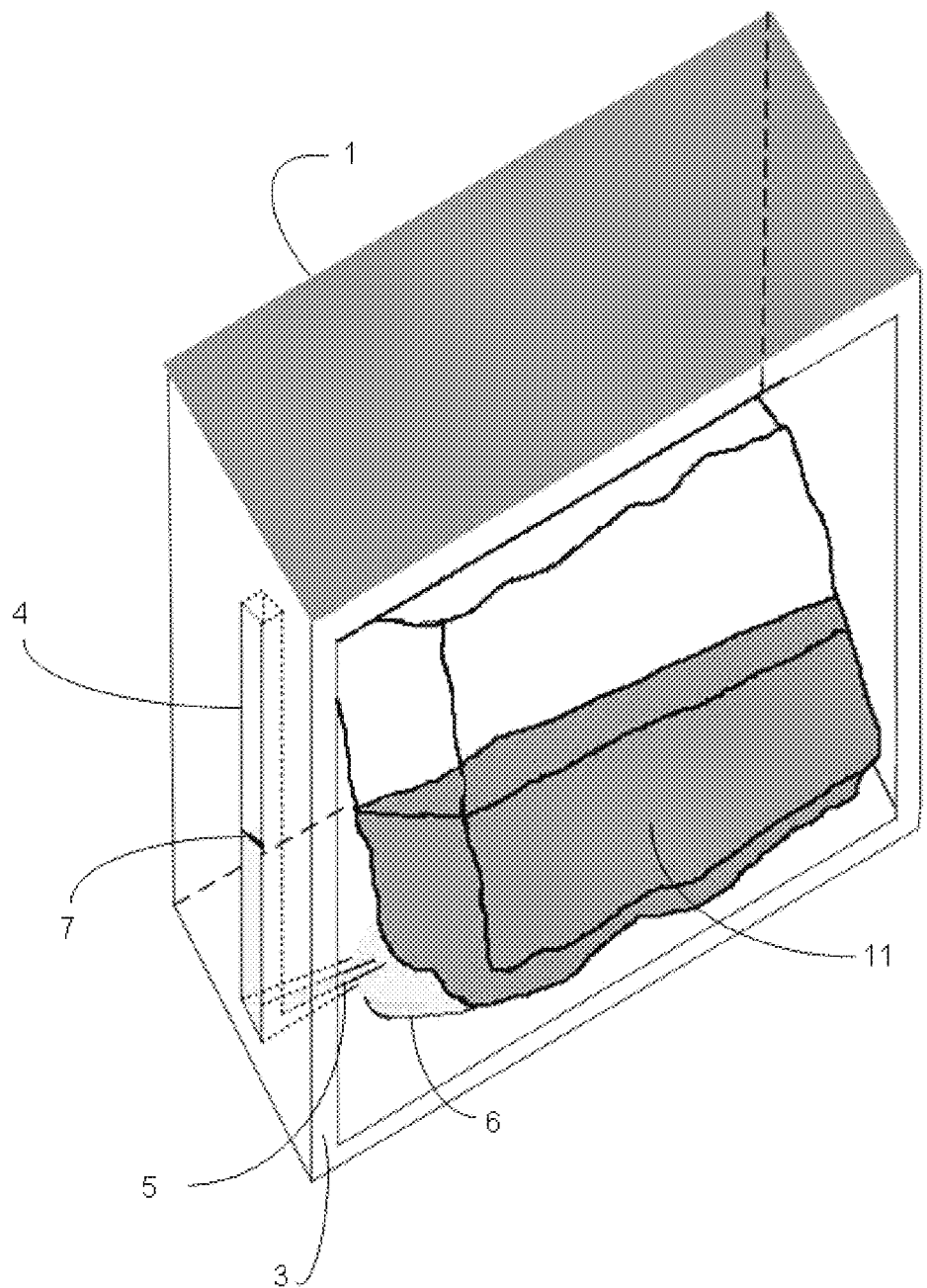
FIG. 2 is a perspective view of how a volume measurement device may be installed in a box that will contain the liquid to be measured.
Figure 3:
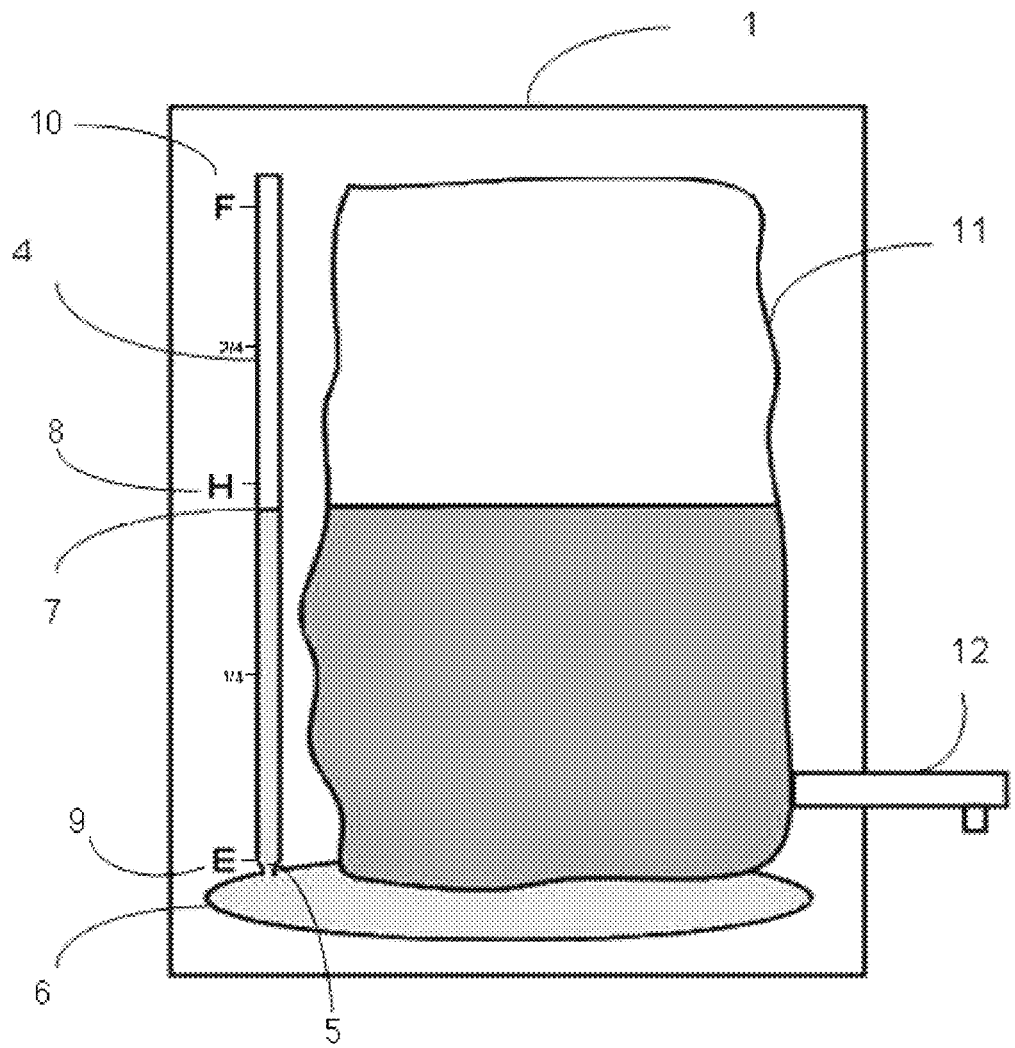
FIG. 3 is a perspective view of a volume measurement device with all its parts.

This patent is about a volume-measuring device installed inside a box that is used to store a liquid. FIG. 1 shows a box 1 that has inside the volume measurement device 2 which has a measuring tower 4 and a volume indicator 7. Also inside box 1, is a sealed plastic bag 11 with a liquid dispenser spout 12. The volume measurement device is composed of several connected elements (See FIG. 2.): a measuring tower 4, a constrictor channel 5, and the receptacle 6. The measuring tower 4 is inserted into a wall 3 of the box 1 in such a way that the tower is visible from outside the box. FIG. 2 also shows a sealed plastic bag 11 that is placed inside box 1 and on top of volume measurement receptacle 6. FIG. 3 shows the whole Volume Measurement Apparatus 2 is composed of a measuring tower 4, a constrictor channel 5, a receptacle 6, a volume indicator 7, and several volume measurement signals 8 for Half full, 9 for Empty and 10 for Full. The whole apparatus 2 is filled with air and sealed. The amount of air will depend on the maximum weight it will support. It will be done in such a way that when the maximum weight is on top of the receptacle 6, the volume indicator will be at the highest level showing a Full load 10. When the receptacle is half-full, the volume indicator 7 is at the half full 8 marker, and when the receptacle is empty, the volume indicator 7 is at the marker Empty 9. The constrictor channel 5 will make the falling of the volume indicator 7 into the receptacle 6 impossible, since the volume indicator 7 will not fit into the constrictor channel 5.

When the Volume Measurement Apparatus is placed correctly into the box as shown in FIG. 1, then when the box is filled with the liquid to be dispensed in a sealed plastic bag 11 with a liquid dispenser spout 12, the weight of such liquid will make the air inside the receptacle 6 move up through the constrictor channel 5 into the measuring tower4 , making the volume indicator 7 move up until it reaches the Full marker. When the liquid is dispensed, the weight will diminish, making less pressure over the receptacle 6, which will make the volume marker 7 go down accordingly in the measuring tower 4.

The disclosure of the invention described herein-above represents the preferred embodiment of the invention; however, variations thereof, in the form, construction, the type of liquid dispensed, and arrangement of the component thereof and the modified application of the invention are possible without departing from the spirit and scope of the appended claim

REFERENCES

[1] Beavis, R., et al. "Product dispensing system", U.S. Pat. No. 9,488,510, Nov. 8, 2016

[2] Palmquist, K., "Liquid level measuring device", U.S. Pat. No. 8,453,878. Jun. 4, 2013

[3] Augustine, M., et al. "Methods and devices for analysis of sealed containers", U.S. Pat. No. 7,012,427. Mar. 14, 2006

[4] Pykett, I., et al. "Method for non-invasively and without contact, inspecting foil enclosed packages, using magnetic resonance techniques", U.S. Pat. No. 6,333,629. Dec. 25, 2001

[5] Augustine, M., et al. "Methods and devices for analysis of sealed containers", U.S. Pat. No. 6,911,822. Jun. 28, 2005

I claim:

1. A volume measurement device to measure and dispense liquids comprised of: a container, a bag for storing and dispensing liquids and a volume measurement device; wherein said bag for storing and dispensing liquids is located inside the container; wherein said container is made of either one of rigid or substantially rigid walls; wherein said volume measurement device is comprised of a measuring tower part, a channel constrictor and a weight measuring receptacle; wherein the weight measurement receptacle made of a sealed resilient leak proof packaging film that has an irregular generally oval shape and is filled with a least one form of gas or air and where the packaging film is form fitted to the bottom of the container and placed beneath the bag for storing and dispensing liquids; wherein the measuring tower part is in fluid communication with the constrictor channel and the weight measuring receptacle; wherein said measuring tower has a graduated measurement scale positioned along said measuring tower and a means for indicating a volume inside said measuring tower; wherein said movement of said means for indicating a weight, volume or relative fill level is synchronized with the pressure from the displacement of air or gas exerted over said weight measuring receptacle by placing the weight of said bag for storing and dispensing liquids on the weight measuring receptacle; wherein the means for indicating a weight, volume or relative fill level of the displaced air or gas will move between and starting at a narrow connecting end of the constrictor channel and move towards the end of the measuring tower opposite the constrictor connection and proportional to the weight, volume or relative fill level of liquid in the bag for storing and dispensing liquids; wherein said measuring tower will have a substantially L-shape bend at said narrow end of said constrictor channel; wherein said measuring tower is embedded in one of the external sides of said container presenting a substantially flat surface that provides a visual view of the means for indicating the weight, volume or relative fill level of the liquid in the bag for storing and dispensing liquids along the graduated measurement scale and that is viewable external to the container.

2. The device of claim 1 wherein the narrow end that connects said weight measuring receptacle with said measuring tower can be extended such that it can be curved around obstacles in said container where weight measuring receptacle will be placed to measure the weight, volume or relative fill level inside such bag for storing and dispensing liquids.

3. The device of claim 1 wherein said graduated measurement scale of said measuring tower contains at least five measurements indicating proportions of liquids in the container.

4. The device of claim 3 wherein said graduated measurement scale reads as measurements of Empty, Full, Half, ¼, and ¾.

5. The device of claim 1 wherein said container has the form of one of a box, a cylinder or a parallelepiped.

6. The device of claim 5 wherein the opposite side of said graduated measurement scale of said measuring tower contains increments marked with integers and half integers starting from zero to the total number of equivalent beverage bottles that said bag for storing and dispensing liquids can hold.

7. The device of claim 1 wherein said bag for storing and dispensing liquids contains beverages, wines, or spirits as said liquid to be stored and dispensed.

8. The device of claim 1 wherein said volume measurement device is constructed as a single unit.

9. The device of claim 1 wherein the bag for storing and dispensing liquids to be dispensed has a liquid dispenser spout.

10. A method to measure a volume of contents and dispense liquids using an volume measurement apparatus comprised of: a container, a bag for storing and dispensing liquids and a volume measurement device; wherein said bag for storing and dispensing liquids is located inside the container; wherein said container is made of either one of rigid or substantially rigid walls; wherein said volume measurement device is comprised of a measuring tower part, a channel constrictor and a weight measuring receptacle; wherein the weight measurement receptacle made of a sealed resilient leak proof packaging film that has an irregular generally oval shape and is filled with a least one form of gas or air and where the packaging film is form fitted to the bottom of the container and placed beneath the bag for storing and dispensing liquids; wherein the measuring tower part is in fluid communication with the constrictor channel and the weight measuring receptacle; wherein said measuring tower has a graduated measurement scale positioned along said measuring tower and a means for indicating a volume inside said measuring tower; wherein said movement of said means for indicating a weight, volume or relative fill level is synchronized with the pressure from the displacement of air or gas exerted over said weight measuring receptacle by placing the weight of said bag for storing and dispensing liquids on the weight measuring receptacle; wherein the means for indicating a weight, volume or relative fill level of the displaced air or gas will move between and starting at a narrow connecting end of the constrictor channel and move towards the end of the measuring tower opposite the constrictor connection and proportional to the weight, volume or relative fill level of liquid in the bag for storing and dispensing liquids; wherein said measuring tower will have a substantially L-shape bend at said narrow end of said constrictor channel; wherein said measuring tower is embedded in one of the external sides of said container presenting a substantially flat surface that provides a visual view of the means for indicating the weight, volume or relative fill level of the liquid in the bag for storing and dispensing liquids along the graduated measurement scale and that is viewable external to the container.

11. A system to measure a volume of contents and dispense liquids comprised of: a container, a bag for storing and dispensing liquids and a volume measurement device; wherein said bag for storing and dispensing liquids is located inside the container; wherein said container is made of either one of rigid or substantially rigid walls; wherein said volume measurement device is comprised of a measuring tower part, a channel constrictor and a weight measuring receptacle; wherein the weight measurement receptacle made of a sealed resilient leak proof packaging film that has an irregular generally oval shape and is filled with a least one form of gas or air and where the packaging film is form fitted to the bottom of the container and placed beneath the bag for storing and dispensing liquids; wherein the measuring tower part is in fluid communication with the constrictor channel and the weight measuring receptacle; wherein said measuring tower has a graduated measurement scale positioned along said measuring tower and a means for indicating a volume inside said measuring tower; wherein said movement of said means for indicating a weight, volume or relative fill level is synchronized with the pressure from the displacement of air or gas exerted over said weight measuring receptacle by placing the weight of said bag for storing and dispensing liquids on the weight measuring receptacle; wherein the means for indicating a weight, volume or relative fill level of the displaced air or gas will move between and starting at a narrow connecting end of the constrictor channel and move towards the end of the measuring tower opposite the constrictor connection and proportional to the weight, volume or relative fill level of liquid in the bag for storing and dispensing liquids; wherein said measuring tower will have a substantially L-shape bend at said narrow end of said constrictor channel; wherein said measuring tower is embedded in one of the external sides of said container presenting a substantially flat surface that provides a visual view of the means for indicating the weight, volume or relative fill level of the liquid in the bag for storing and dispensing liquids along the graduated measurement scale and that is viewable external to the container.

\* \* \* \* \*